2,802,797
RESILIENT TILE

Robert L. Lerch, Lancaster, Pa., assignor to Armstrong Cork Company, Lancaster, Pa., a corporation of Pennsylvania No Drawing. Application December 24, 1952, Serial No. 327,909

2 Claims. (Cl. 260—25)

This invention relates to a resilient tile and a method of making the same. More particularly, the invention relates to a greaseproof floor tile composed of a filler and a plasticized binder including at least one rosin-modified phenolic resin. The method of my invention involves mixing, milling, calendering, and cutting the composition of my invention under carefully controlled conditions.

Greaseproof tiles have been made from various compositions, such as those including polystyrene and equivalent hydrocarbon resins. However, there have been many difficulties and shortcomings of greaseproof tiles made in accordance with prior art formulations. For example, due to the presence of resins such as polystyrene, such tiles have exhibited poor resistance to kerosene and, therefore, have not been suitable for use in areas where kerosene or similar hydrocarbon fractions are used widely. In addition, due to the particular composition of many prior art tiles, the products have a tendency to curl after installation. Another problem presented by prior art formulations involves moisture growth of the tile. Moisture growth also results in peaked seams, and the tendency of such tiles to grow upon absorption of moisture requires many replacements in the field.

I have found that outstanding greaseproof floor tiles can be manufactured under controlled conditions which are readily obtained when plasticized rosin-modified phenolic resins are compounded in certain proportions with filler materials to produce a readily workable mass which can be processed to give outstanding floor tiles.

The tiles of my invention are characterized by resistance to oils and greases normally used in the home, resistance to kerosene and similar hydrocarbons, are substantially free from any tendency to curl, and are greatly improved in resistance to moisture growth.

In accordance with my invention, the rosin-modified phenolic resins employed in producing the binder may be obtained by reacting phenol, formaldehyde, and rosin and thereafter esterifying with a polyhydric alcohol to produce what is well-known in the art as a rosin-modified phenolic resin. Other phenols such as bis-phenol and the cresols may be used in producing these resins. Typical of the polyhydric alcohols employed in esterification of the rosin-phenol-formaldehyde reaction product are glycol, glycerol, pentaerythritol, and the like. It is also possible within the scope of my invention to utilize rosin-modified phenolic resins in which an alkyd structure has been built by including dicarboxylic acids or anhydrides such as maleic anhydride in the esterification step. Thus, a wide variety of characteristics can be imparted to these rosin-modified phenolic resins, such as alkali resistance and the like. If desired, in the production of the binder of the tile of my invention, mixtures of resins such as a mixture of rosin-modified phenolic obtained by reacting rosin, phenol, and formaldehyde and esterifying with glycerine in the presence of maleic anhydride and a rosin-modified phenolic resin obtained by reacting rosin, phenol, and formaldehyde and esterifying with a mixture of glycol and glycerine may be used. Thus, one resin may impart alkali resistance to the final composition and another may impart grease resistance to the composition. Generally speaking, the softening points of the resins employed in the production of the tile binder may vary between 138° C. to 142° C., such as is found in an esterified rosin-modified phenol-formaldehyde resin, to 115° C. to 125° C., and to 105° C. to 108° C. These are softening point ranges of typical rosin-modified phenol resins which may be employed in the practice of my invention. The production of these resins forms no part of my invention, but is well known to the art.

The rosin-modified phenolic resins are mixed with suitable plasticizers or mixtures of plasticizers. Typical of the plasticizers which may be employed are butyl benzyl phthalate, mixed ortho and para toluene ethyl sulfonamides, phthalyl glycollates, and the like. Generally speaking, these plasticizers are such as avoid decreasing the grease resistance and alkali resistance of the finished product.

The filler materials employed in the composition of my invention are advantageously a mixture of finely divided filler, such as ground limestone, serpentine, talc, and the like; and fibrous mineral filler, such as asbestos, fibrous talc, and the like. Generally speaking, the composition of my invention comprises about 70% to about 80% by weight filler and about 20% to about 30% by weight binder. Pigments may be used in the tile to produce the desired color effect. Pigments such as titanium oxide, carbon black, iron oxide, ochre, or other suitable pigments can be used. The filler component of my invention includes about 25% to 50% by weight of fibrous filler, such as asbestos, and about 30% to about 55% by weight of fine filler, including pigments.

In order to obtain the desired properties in the tile, I find that the proportions of the various ingredients should be maintained within certain limits as follows:

Fine filler, about 30% to about 55%
Fibrous filler, about 25% to about 50%
Plasticizer, about 4% to about 9%
Rosin-modified phenolic resin, about 15% to about 23%

In accordance with the process of my invention, all of the ingredients are charged to a mixer and mixed at temperatures up to about 315° F. While the time required to accomplish the desired mixing may vary, depending upon the temperature of operation of the mixer, the first-stage mixing normally requires about 25 to about 27 minutes when the steam pressure in the mixer jacket is about 110 to about 120 pounds per square inch. The mixed ingredients are then placed upon a mill to form what is known in the art as a blanket. The conditions of blanket formation are advantageously such that the cold roll is maintained at a temperature of about 175° F. to about 185° F. and the hot roll about 325° F. to about 340° F. The stick temperature of the composition of my invention is in the range of about 130° F. to about 190° F. so the mass adheres to the cold roll in the blanket-forming operation. After the blanket is removed from the cold roll, it is passed through at least one calender to give the sheet the finished surface. In passing through the calender, the face roll is maintained at a temperature of about 105° F. to about 115° F. and the bottom roll at a temperature of about 85° F. to about 95° F. Following passage through the calender, the material is cooled by means of water, air, or both, and is then cut into the tile shapes. Generally speaking, it is advantageous to bring the mass down to a temperature in the range of about 120° F. to about 140° F. before severing the sheet into tiles.

In a particularly advantageous embodiment of my invention, the blanket is passed through two calenders. Following passage through the first calender, operated as indicated above, the finishing calender is operated at a temperature on the face roll of about 100° F. to about 110° F. and a temperature on the bottom roll of about 80° F. to about 90° F.

In order to more fully understand my invention, reference is made to the following specific example:

Example I

The following composition was made into tiles by the procedure described above:

| | Parts by weight |
|---|---|
| Asbestos fibers | 33.0 |
| Limestone and pigments | 44.0 |
| N-ethyl-ortho and para toluene sulfonamides mixture | 3.2 |
| Butyl benzyl phthalate | 3.0 |
| Reaction product of rosin, phenol, and formaldehyde esterified with a mixture of glycol and glycerine and having a ring and ball melting point of 138° C. to 142° C. | 8.4 |
| Reaction product of rosin, phenol, and formaldehyde esterified with a mixture of glycerol and maleic anhydride and having a ring and ball melting point of 115° C. to 125° C. | 8.4 |

Tiles produced in accordance with my invention are characterized by a smooth surface, high resistance to oils and greases, and freedom from tendency to curl. The tiles are resistant to indentation and are also dimensionally stable. While my invention has been described with particular reference to a floor tile, the materials may also be used as a wall tile.

I claim:

1. A resilient tile composition containing the following ingredients in substantially the following percentages by weight:

| | Percent |
|---|---|
| Asbestos fibers | 33.0 |
| Limestone and pigments | 44.0 |
| N-ethyl-ortho and para toluene sulfonamides mixture | 3.2 |
| Butyl benzyl phthalate | 3.0 |
| Reaction product of rosin, phenol, and formaldehyde esterified with a mixture of glycol and glycerine and having a ring and ball melting point of 138° C. to 142° C. | 8.4 |
| Reaction product of rosin, phenol, and formaldehyde esterified with a mixture of glycerol and maleic anhydride and having a ring and ball melting point of 115° C. to 125° C. | 8.4 |

2. A resilient tile composition comprising about 30% to about 55% finely divided inorganic filler, about 25% to about 50% fibrous mineral filler, about 15% to about 23% of at least one rosin-modified phenol-formaldehyde resin, obtained by reacting phenol, formaldehyde, and rosin and thereafter esterifying with a polyhydric alcohol and having a softening point of 105° C. to 142° C., and about 4% to about 9% plasticizer for the resin.

References Cited in the file of this patent

UNITED STATES PATENTS

| | | |
|---|---|---|
| 2,338,543 | Rosenblum | Jan. 4, 1944 |
| 2,362,934 | Schloanstine | Nov. 14, 1944 |
| 2,380,192 | Schloanstine | July 10, 1945 |
| 2,390,189 | Soday | Dec. 4, 1945 |
| 2,516,351 | Stanford et al. | July 25, 1950 |